US011122096B1

(12) United States Patent
Straitiff et al.

(10) Patent No.: US 11,122,096 B1
(45) Date of Patent: Sep. 14, 2021

(54) SYSTEM AND METHOD FOR HOTEL MULTICAST SERVICES MANAGER

(71) Applicant: Marriott International, Inc., Bethesda, MD (US)

(72) Inventors: David M. Straitiff, East Amherst, NY (US); Neil R. Schubert, III, Clarksburg, MD (US); William R. Walker, Omaha, NE (US)

(73) Assignee: Marriott International, Inc., Bethesda, MD (US)

( * ) Notice: Subject to any disclaimer, the term of this patent is extended or adjusted under 35 U.S.C. 154(b) by 0 days.

(21) Appl. No.: 16/946,229

(22) Filed: Jun. 11, 2020

Related U.S. Application Data

(63) Continuation of application No. 15/291,918, filed on Oct. 12, 2016, now Pat. No. 10,686,856.
(Continued)

(51) Int. Cl.
*H04L 29/06* (2006.01)
*H04L 29/08* (2006.01)
(Continued)

(52) U.S. Cl.
CPC ...... *H04L 65/4076* (2013.01); *H04L 61/1511* (2013.01); *H04L 65/105* (2013.01);
(Continued)

(58) Field of Classification Search
CPC ... H04L 65/60; H04L 65/105; H04L 65/1073; H04L 67/18; H04N 21/4126
See application file for complete search history.

(56) References Cited

U.S. PATENT DOCUMENTS 7,941,839 B2 * 5/2011 Siegrist ............... H04L 63/0281
726/11
8,645,509 B2 2/2014 Carriere
(Continued)

FOREIGN PATENT DOCUMENTS

WO 2014143171 9/2014
WO WO-2014143171 A1 * 9/2014 ............. H04L 63/08

OTHER PUBLICATIONS

U.S. Appl. No. 15/291,918 , "Final Office Action", dated Sep. 27, 2019, 15 pages.
(Continued)

*Primary Examiner* — Lashonda T Jacobs
(74) *Attorney, Agent, or Firm* — Kilpatrick Townsend & Stockton LLP

(57) ABSTRACT

System and methods for initiating a media streaming device, particularly for devices associated with a guest services environment. Such initiation may include: receiving, at a proxy server, a request from a mobile device to join a guest services network, the request identifying a user of the mobile device; verifying a registration of the user, the registration indicating permission of the user to join the guest services network, to yield a verification; identifying, based on the verification, a media streaming device associated with the registration of the user; and configuring the media streaming device to be controllable by the mobile device, such that control commands are routed from the mobile device through the proxy server to the media streaming device, and streaming content is routed from the Internet to the media streaming device bypassing the proxy server.

20 Claims, 6 Drawing Sheets

Related U.S. Application Data

(60) Provisional application No. 62/240,969, filed on Oct. 13, 2015.

(51) Int. Cl.
*H04L 29/12* (2006.01)
*H04N 21/41* (2011.01)
*H04W 84/12* (2009.01)

(52) U.S. Cl.
CPC .......... *H04L 65/1073* (2013.01); *H04L 65/60* (2013.01); *H04L 67/16* (2013.01); *H04L 67/18* (2013.01); *H04L 67/28* (2013.01); *H04N 21/4126* (2013.01); *H04W 84/12* (2013.01)

(56) References Cited

U.S. PATENT DOCUMENTS

| | | | | |
|---|---|---|---|---|
| 8,813,138 | B2* | 8/2014 | Warrick | H04L 67/16 725/78 |
| 8,875,179 | B2* | 10/2014 | Savard | H04N 21/25816 725/38 |
| 8,887,193 | B2* | 11/2014 | Xiong | H04N 21/458 725/30 |
| 8,972,539 | B2 | 3/2015 | Carriere | |
| 8,977,710 | B2* | 3/2015 | Caunter | H04L 67/32 709/218 |
| 9,060,197 | B2 | 6/2015 | Warrick et al. | |
| 9,137,281 | B2* | 9/2015 | Warrick | H04L 65/4084 |
| 9,172,733 | B2 | 10/2015 | Warrick et al. | |
| 9,344,398 | B2 | 5/2016 | Carriere | |
| 9,369,748 | B2 | 6/2016 | Warrick et al. | |
| 9,473,940 | B2* | 10/2016 | Wong | H04L 67/02 |
| 9,559,942 | B2* | 1/2017 | Kuo | H04L 65/4084 |
| 9,661,366 | B2* | 5/2017 | Warrick | H04L 67/04 |
| 9,742,691 | B2* | 8/2017 | Baker | H04L 41/0896 |
| 9,967,604 | B2* | 5/2018 | Warrick | H04N 21/4126 |
| 10,015,265 | B2* | 7/2018 | Warrick | H04L 67/141 |
| 10,026,101 | B2* | 7/2018 | Cassidy | G06Q 30/0261 |
| 10,104,423 | B2* | 10/2018 | Watson | H04L 67/1095 |
| 10,354,346 | B1* | 7/2019 | Lok | H04L 63/0892 |
| 10,499,102 | B2* | 12/2019 | Warrick | H04N 21/4126 |
| 10,589,909 | B2* | 3/2020 | Daggett | B65D 51/18 |
| 10,686,856 | B1* | 6/2020 | Straitiff | H04L 65/4084 |
| 10,693,923 | B2* | 6/2020 | AbiEzzi | H04L 65/1089 |
| 2004/0116115 | A1* | 6/2004 | Ertel | H04W 4/00 455/426.2 |
| 2009/0271523 | A1* | 10/2009 | Gentry | H04L 63/0272 709/228 |
| 2011/0298596 | A1* | 12/2011 | Warrick | H04L 12/282 340/12.53 |
| 2011/0302607 | A1* | 12/2011 | Warrick | H04N 21/4126 725/39 |
| 2011/0314497 | A1* | 12/2011 | Warrick | H04N 21/2143 725/38 |
| 2012/0084252 | A1* | 4/2012 | Zha | G06F 16/256 707/600 |
| 2012/0110628 | A1* | 5/2012 | Candelore | H04N 21/234327 725/110 |
| 2012/0166628 | A1* | 6/2012 | Kullos | H04N 21/64322 709/224 |
| 2013/0052522 | A1* | 2/2013 | Inoue | H01M 4/583 429/188 |
| 2013/0262158 | A1* | 10/2013 | You | G06Q 10/02 705/5 |
| 2013/0305320 | A1* | 11/2013 | Warrick | G06F 21/31 726/4 |
| 2013/0305341 | A1* | 11/2013 | Baker | H04L 41/0886 726/11 |
| 2013/0346564 | A1* | 12/2013 | Warrick | H04L 65/1073 709/219 |
| 2014/0143380 | A1 | 5/2014 | Warrick et al. | |
| 2014/0195675 | A1* | 7/2014 | Silver | H04L 65/607 709/224 |
| 2015/0373123 | A1* | 12/2015 | Warrick | H04L 67/32 709/228 |
| 2016/0014166 | A1* | 1/2016 | Warrick | H04L 41/0893 370/254 |
| 2016/0037200 | A1* | 2/2016 | Gordon | H04N 21/2343 725/38 |
| 2016/0286265 | A1* | 9/2016 | Watson | H04N 21/43637 |
| 2017/0094345 | A1* | 3/2017 | Zerr | H04N 21/6583 |
| 2017/0195695 | A1* | 7/2017 | Patrick | H04N 21/4185 |
| 2017/0353506 | A1* | 12/2017 | Warrick | H04L 65/4084 |
| 2018/0063256 | A1* | 3/2018 | Warrick | H04L 67/142 |
| 2019/0190992 | A1* | 6/2019 | Warrick | H04L 67/125 |

OTHER PUBLICATIONS

U.S. Appl. No. 15/291,918, "Non-Final Office Action", dated Jul. 2, 2018.

U.S. Appl. No. 15/291,918, "Non-Final Office Action", dated Jan. 10, 2019, 14 pages.

U.S. Appl. No. 15/291,918, "Notice of Allowance", dated Feb. 12, 2020, 11 pages.

* cited by examiner

SYSTEM AND METHOD FOR HOTEL MULTICAST SERVICES MANAGER

CROSS REFERENCE & PRIORITY INFORMATION

The present application claims priority to U.S. patent application Ser. No. 15/291,918, filed Oct. 12, 2016, now U.S. Pat. No. 10,686,856, issued on Jun. 16, 2020, which application claims the benefit of and is a non-provisional of U.S. Provisional Application No. 62/240,969, filed Oct. 13, 2015, the contents of which are incorporated herein in their entireties.

BACKGROUND

Hotels and other providers of guest services often provide Internet access and/or cable television to guests. With respect to High Speed Internet Access (HSIA), guest service providers often require guests to provide registration information before providing Internet access, whereas televisions are generally located in the guest space and require no additional access. New streaming technologies, such as GOOGLE CHROMECAST, allow users to control content being shown on a television from mobile devices such as phones, tablets, and computers. Such streaming devices operate by the user initiating the streaming of content via the mobile device, then the content is streamed directly from the Internet to the streaming device/television (not relaying the content through the user's mobile device).

SUMMARY

A method for streaming digital content comprising: storing, by one or more servers, guest check-in information; receiving, by the one or more servers, a registration request from a mobile device of a guest; registering, by the one or more servers, the mobile device by comparing the registration request with the guest check-in information; receiving, by a proxy server, mobile device identification and a guest identifier from the one or more servers after registering the mobile device; permitting, by the proxy server, select network communication between a media streaming device and the mobile device, wherein the media streaming device is connected to, or incorporated in, a display device, wherein the display device is located in a room associated with the guest; routing, by the proxy server, instructions from the mobile device to the media streaming device for downloading content by the media streaming device from an internet source; and displaying, on the display device, content from the media streaming device, wherein the content is streamed from the internet source.

A system for streaming digital content comprising: a display device in a room having an associated room number; a media streaming device connected to the display device, the media streaming device in communication with a hidden network; a proxy server in communication with the media streaming device over the hidden network; and a property management server in communication with the proxy server, the property management server including names and room numbers of guests, wherein the proxy server is operable to: transmit connection information from the media streaming device over a guest network to a mobile device registered to a guest associated with the room number of the room, and transmit content selection options from the mobile device to the media streaming device, and wherein the media streaming device displays content on the display device based on the content selection options from the mobile device.

A method for initiating a media streaming device may include: receiving, at a proxy server, a request from a mobile device to join a guest services network, the request identifying a user of the mobile device; verifying a registration of the user, the registration indicating permission of the user to join the guest services network, to yield a verification; identifying, based on the verification, a media streaming device associated with the registration of the user; and configuring the media streaming device to be controllable by the mobile device, such that control commands are routed from the mobile device through the proxy server to the media streaming device, and streaming content is routed from the Internet to the media streaming device bypassing the proxy server.

A system for initiating a media streaming device may include: a processor; and a computer-readable storage medium having instructions stored which, when executed by the processor, cause the processor to perform operations comprising: receiving, at a proxy server, a request from a mobile device to join a guest services network, the request identifying a user of the mobile device; verifying a registration of the user, the registration indicating permission of the user to join the guest services network, to yield a verification; identifying, based on the verification, a media streaming device associated with the registration of the user; and configuring the media streaming device to be controllable by the mobile device, such that control commands are routed from the mobile device through the proxy server to the media streaming device, and streaming content is routed from the Internet to the media streaming device bypassing the proxy server.

A non-transitory computer-readable storage device having instructions stored which, when executed by a processor, cause the processor to perform operations to initiate a media streaming device, the operations comprising: receiving, at a proxy server, a request from a mobile device to join a guest services network, the request identifying a user of the mobile device; verifying a registration of the user, the registration indicating permission of the user to join the guest services network, to yield a verification; identifying, based on the verification, a media streaming device associated with the registration of the user; and configuring the media streaming device to be controllable by the mobile device, such that control commands are routed from the mobile device through the proxy server to the media streaming device, and streaming content is routed from the Internet to the media streaming device bypassing the proxy server.

Additional features, advantages, and configurations of the invention are set forth or apparent from consideration of the following detailed description, drawings, and claims. Moreover, it is to be understood that both the foregoing summary and the following detailed description are examples and are intended to provide further explanation without limiting the scope of the invention as claimed.

BRIEF DESCRIPTION OF THE DRAWINGS

As illustrated in the accompanying drawings, like reference numbers generally indicate identical, functionally similar, and/or structurally similar elements. The first digits in the reference number indicate the drawing in which an element first appears.

DETAILED DESCRIPTION

Figure 1:
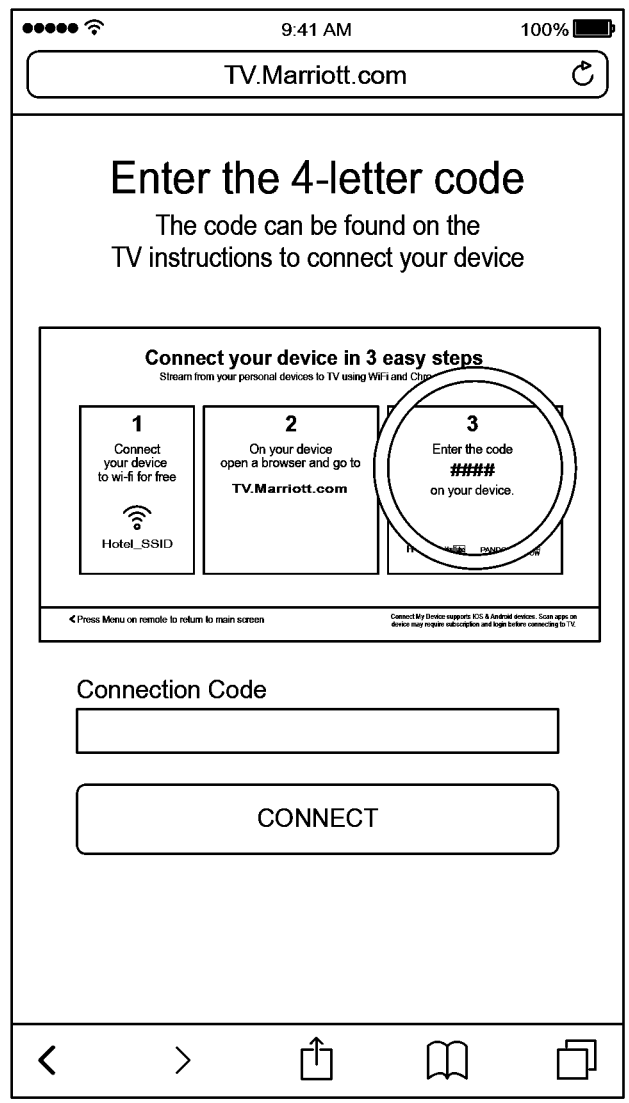
FIG. 1 depicts an example screen shot for a guest to setup in-room content streaming.

Various configurations of the disclosure are described in detail below. While specific implementations are described, it should be understood that this is done for illustration purposes only. Other components and configurations may be used without parting from the spirit and scope of the disclosure. In describing and illustrating the provided examples, specific terminology is employed for the sake of clarity. However, a person skilled in the relevant art will recognize that other components and configurations may be used without parting from the spirit and scope of the disclosure. It is to be understood that each specific element includes all technical equivalents that operate in a similar manner to accomplish a similar purpose. The examples and configurations described herein are non-limiting examples.

All publications cited herein are hereby incorporated by reference in their entirety.

As used herein, the term "a" refers to one or more. The terms "including," "for example," "such as," "e.g.," "may be" and the like, are meant to include, but not be limited to, the listed examples. The term "product" may refer to both products and services. While various examples are provided regarding a "hotel," the term "hotel" may refer to a hotel, motel, or other establishment where a guest or customer may need physical access to a location for a limited period of time (e.g., hotel, gym, inn, motel, spa, etc.). For example, the concepts described herein regarding a hotel guest checking into a guest room may similarly apply to a renter of a beach house, where the renter has access to a multi-room facility, as well as an airline passenger where the passenger has access only to a limited seating area. The terms "user," "guest," "client," and/or "customer" may be synonyms.

Modern streaming devices, such as GOOGLE CHROMECAST, allow users to control what is displayed on televisions using mobile devices, such as smartphones, tablets, laptops, mobile computing devices (including wearables, such as smart watches), and computers. For example, a user watching a YOUTUBE video on their phone can move display of the video from their phone to a television. To link a mobile device, such as a CHROMECAST, the mobile device may send out a mDNS (Multicast Domain Name Service) request. The mDNS request identifies nearby devices of the type sought after. In a typical LAN (a Local Area Network, e.g., a home network), all CHROMECAST devices on the LAN reply to the mDNS request. For example, a mDNS request made at one's home to identify nearby CHROMECAST devices will identify both a user's CHROMECAST but may also identify the CHROMECAST belonging to the neighbor. The user then selects their CHROMECAST, at which point the user's mobile device is configured to control the CHROMECAST, and the CHROMECAST is configured to receive commands from the user's device. Following this configuration, the user can initiate streaming of content from NETFLIX, HULU, or other Internet based resources such that the content streams directly from the Internet location to the media streaming device, the content bypassing the user's device. In this way, the user's phone (or other mobile device) is used for command and control operations over the media content.

Hotels and other guest services seek to allow guests to use CHROMECASTs and other media streaming devices to direct content from Internet resources to televisions (or other display devices) in the assigned guest rooms or spaces. Two exemplary technical challenges associated with allowing guests to use pre-installed media streaming devices are (1) ensuring that only registered guests are provided access to the media streaming devices and (2) modifying the casting of the mDNS request so the guest device can only "see" and use the devices in their room (that is, not the devices in their neighbor's room).

To account for these challenges, equipment may be provided to isolate and selectively route device communication transmissions (e.g., multicast DNS discovery services (mDNS)) on a network (e.g., a hotel guest network). More specifically, a proxy server can be implemented which routes communicates between the mobile device and the media streaming device on a network. The proxy server can modify the mDNS request process used to discover devices on the network, such that devices registered to other guestrooms are unavailable to anyone but their respective guests. However, where a guest space contains more than one media streaming device (such as a first media streaming device associated with a television in a living room and a second media streaming device associated with a television in a bedroom), the mDNS request can return a notification/status regarding all of the devices associated with the guest's space.

A media streaming device (e.g., GOOGLE CHROMECAST, LENOVO CAST, APPLE TV, ROKU, FIRETV, etc.) may be connected to a display (e.g., a monitor, television, screen, etc.) and pre-registered with a proxy server for a guest staying in a room containing that display to use. The guest may be restricted from accessing the configuration settings of the provided media streaming device. The media streaming device may be connected to an existing set top box (in an assigned guestroom, for example) to provide HDMI switching and USB power. The menu from the set top box, for example, may manage switching input sources on the display to the HDMI port connected to the media streaming device. In other configurations, the media streaming device can be incorporated in (e.g., built into) the display device. Multiple displays may be in a guest's room and each display may be connected to a separate media streaming device.

The normal hotel device registration process may be enhanced to selectively permit traffic between the registered mobile device (e.g., guest's device) and the specific media streaming devices in the guest's registered room(s). Media streaming devices may be deployed one-per-display in all or selected rooms in a hotel. The media streaming devices may be attached to a display device and powered by a USB connector, for example. Media streaming devices may be discovered by the mobile device using multicast DNS discovery services (mDNS). For example, a mobile device may multicast a request for "all CHROMECAST devices on the network." In a typical LAN (e.g., a home network), all CHROMECAST devices on the LAN reply to the mDNS request. Because mDNS is not a routable protocol, a "proxy" server may be introduced to the on-property architecture. One purpose of the proxy server may be to selectively permit network communications between registered mobile devices and media streaming devices in their room(s).

Using the guest room number (or other guest identifier) and identifying information from the guest device (e.g., network/IP address and/or MAC address), the proxy server may dynamically relay traffic between that guest's mobile device on, for example, the hotel WI-FI and the media streaming devices in their room(s) on the hidden VLAN. In one embodiment, media streaming devices (e.g., CHROMECAST devices) may be on the hidden VLAN. When an mDNS request for all media streaming devices is transmitted from a mobile device, the answers to the mDNS request may be filtered (via the proxy) with only the media streaming devices that are chosen to be available to the mobile device that transmitted the request. For example, the mobile device transmitting the mDNS request may be supplied only with connectivity options for media streaming devices belonging to an assigned room or rooms.

A checked-in guest, for example, may register one or more PCs and/or mobile devices (hereafter, "mobile device") to a hotel-wide WI-FI and identify and control any media streaming devices present in their assigned room(s) until check-out.

Media streaming devices may allow a guest to use a mobile device to initiate an internet video stream to a display in their room. When using a CHROMECAST device, for example, the internet video stream flows directly from the internet source to the media streaming device, where the video stream does not flow through the initiating mobile device. Only command and control requests, such as the media streaming device discovery request, the stream initiation command, volume control, pause, fast forward, rewind, etc., may flow between the mobile device and the media streaming device.

Operators (e.g., hotel employees/associates) may configure media streaming devices through a web application that assigns an appropriate network name to each media streaming device according to the room (or space in the room, e.g., "Den") where the related display resides. Media streaming device names may describe a location (e.g., "Room 201," "Room 202 Den," etc.).

Consider the following example of a hotel (or other guest service provider) initiating a media streaming device for guest usage. A guest checks into a hotel and, upon physically entering an assigned room, a display (e.g., television) may show, for example, a landing page describing functionality on how to connect their mobile device to the network. The landing page may, for example, describe how to connect to the hotel network for wireless Internet access. The landing page can further describe how to connect to a media streaming device (e.g., by entering a code, password, or login information), personalized information about the stay, etc. The landing page may or may not be interactive or interface with the remote control for the display. For example, the display may, when the guest enters the room, display a landing page having connection information for how to connect to the hotel's Wi-Fi and contain instructions for how to find the validation code needed to connect the guest's mobile device (phone, tablet, etc.) to a media streaming device (e.g., CHROMECAST) connected to the hotel's television or other display. As the guest follows the instructions displayed on the landing page, the guest gains the ability to stream content through the media streaming device to the display, controlled through the guest's mobile device.

As further described below, a proxy server can be used to receive commands and instructions from the user's device, then forward commands and instructions as appropriate. During initial registration by a user of a mobile device, the proxy server may receive the user's registration information and verify the registration status of the user with a Property Management System (PMS). The PMS can, for example, include one or more servers. If the PMS indicates the guest is a valid registered guest, the proxy server may receive guest mobile device registration notifications from the LAN Service Provider (LSP) Gateway containing the guest's room number(s) and associated network address information for the particular guest mobile device. The LSP gateway may support and manage the network on a property including guest internet access. The LSP gateway may control access to the guest internet (e.g., the LSP gateway may require a guest to initially register to use internet service).

The media streaming devices may be installed in a single hotel-wide virtual local area network (VLAN) (wired or wireless) that is hidden from the guest. Using the guest room number (or other guest identifier) and identifying information from the guest device (e.g., network/IP address and/or MAC address), the proxy server may dynamically relay traffic between that guest's mobile device on, for example, the hotel WI-FI and the media streaming devices in their room(s) on the hidden VLAN.

For example, when an mDNS request for all media streaming devices is transmitted from a mobile device, the answers to the mDNS request may be filtered (via the proxy) with only the media streaming devices that are chosen to be available to the mobile device that transmitted the request. More specifically, the mobile device transmitting the mDNS request may be supplied only with connectivity options for media streaming devices belonging to an assigned room or rooms.

Once the user's mobile device is confirmed as belonging to a registered guest, the user's device may be registered with the proxy server, and the media streaming device in the user's room may be configured to receive commands from the user's device. At this point, commands can be routed through the proxy server to enable the media streaming device to receive and display streaming media content. While the control commands can be received at the proxy server from the user's mobile device and forwarded to the media streaming device, the streaming content itself can bypass both the proxy server and the user's mobile device.

This configuration provides guests with the ability to continue to use their personal streaming accounts while in the hotel, and provides hotels with another perk of staying in specific hotels or rooms. Operators (e.g., hotel employees/associates) may configure media streaming devices through a web application that assigns an appropriate network name to each media streaming device according to the room (or space in the room, e.g., "Den") where the related display resides. Media streaming device names may describe a location (e.g., "Room 201," "Room 202 Den," etc.). Media streaming devices may be deployed one-per-display in all or selected rooms in a hotel.

In one configuration, the media streaming device may be visible only to guests registered in an appropriate room per a HSIA (High Speed Internet Access)/LSP (Layered Service Provider) gateway. In such configurations, the media streaming device may have a recognizable name including the room number that it was installed in (e.g., "Room 205"). In another configuration, guests may only see the media streaming device after selecting, purchasing, and/or being granted an enhanced internet access service, and not when connected to a standard access service.

In some configurations, guests may be able to connect their mobile device to the media streaming device through a compatible media player application or browser. Guests may not need to enter any additional passwords beyond the authentication needed to connect to the hotel WI-FI account for the room.

Once connected to the media streaming device, media streaming compatible applications (e.g., CHROME, NETFLIX, WATCH ESPN, AMAZON, HULU, etc.) may be accessed and content may be streamed to the display. In some configurations, applications may be opened on the mobile device (e.g., a CHROMECAST compatible CHROME browser with the CHROMECAST extension installed) and content may be streamed to the display upon initiating the streaming at the mobile device. The streaming capabilities that the media streaming device offers may be provided to the guest.

To provide further detail regarding the types of personal mobile devices which may be used for interactions with the media streaming devices, the media streaming may support, for example, at least, ANDROID devices (e.g., tablets, phones, etc.), IOS devices (tablets, phones, etc.), Mac OS devices, and WINDOWS devices (tablets, phones, PCs, etc.). Further, GOOGLE CHROME browser for IOS and WINDOWS PCs, for example, may be capable of streaming browser content to a media streaming device.

Tracking, reporting, rating, and billing support for the streaming may be provided. For example, the bandwidth consumed by each media streaming device per room number per day; the applications used on a media streaming device per room number per day; the time spent using media streaming per room number per day; and a heartbeat report (to ensure media streaming are on and connected to internet) may be tracked, reported, rated, and/or billed.

Other guests or visitors may not have access to the media streaming device assigned to the guest's room. In addition, the guests themselves may not have access to the administrative interface of the media streaming device or make configuration changes to the media streaming device. The media streaming device may be directly connected to the display via, for example, an HDMI connection, or may be built into the television. The media streaming device may be physically secure in the guest room or located in a secure location outside of the guest room. The media streaming device may be configurable via an online or automated interface to facilitate configuration of a large numbers of devices. Media streaming device configuration may take less than 3 minutes to configure a device electronically for installation in a guest room. Hotel engineers and/or network administrators may be able to see the streaming devices remotely from a network vantage point to determine whether they are installed and powered on. The media streaming devices may be updated with a software push from a remote location over the internet. The media streaming devices may be securely accessed via an interface that unauthorized people cannot access.

Upon disconnection of the media streaming device, the display (e.g., television) may revert to the landing page as when the display was first turned on. To watch television, for example, the guest may use channel buttons.

FIG. 1 depicts an example screen shot 100 for a guest to setup in-room content streaming. In this example, the setup process has three steps. First, the guest connects their device to the hotel WI-FI. For example, guests may be able to purchase or provision internet service via personal devices (e.g., tablet, mobile phone or personal computer). A guest may use, for example, a mobile device to make a registration request to join the WI-FI network. Next, Guests may be able to stream content wired or wirelessly from their personal device, or control content streaming from the internet, to a display in the guest's room, by browsing on their mobile device to a webpage such as "tv.marriott.com," where the guest can be provided a four digit code. When the guest enters the four digit code found on their device and presses "connect," a validation of the code can occur (for example, using either with a proxy server or with a Property Management System), which identifies the code as valid and configures the media streaming devices associated with the guest's space to operate with that specific mobile device of the guest. If the guest wishes to enable additional mobile devices to be enabled to control the media streaming devices for their room, the guest would repeat the WI-FI enablement and code entering processes for that additional device.

In some configurations, guests may be able to connect to the hotel network using, for example, the existing connect screens for the hotel's WI-FI (e.g., hotel's WI-FI hotspot). Registering for an internet connection may require, for example, a room number and a name (e.g., guest check-in information). This information can, in certain configurations, be verified by a Property Management System (PMS). Exemplary personal mobile devices which a guest may register to join the WI-FI network include phones, smartphones, tablets, personal computers, reading devices, etc. Once registered, the system may store an address (MAC or IP) of the mobile device (e.g., mobile device identification). Guests may not need to connect to a specific WI-FI point of presence (PoP) for the guest's room to attach to an appropriate media streaming device.

Figure 2:
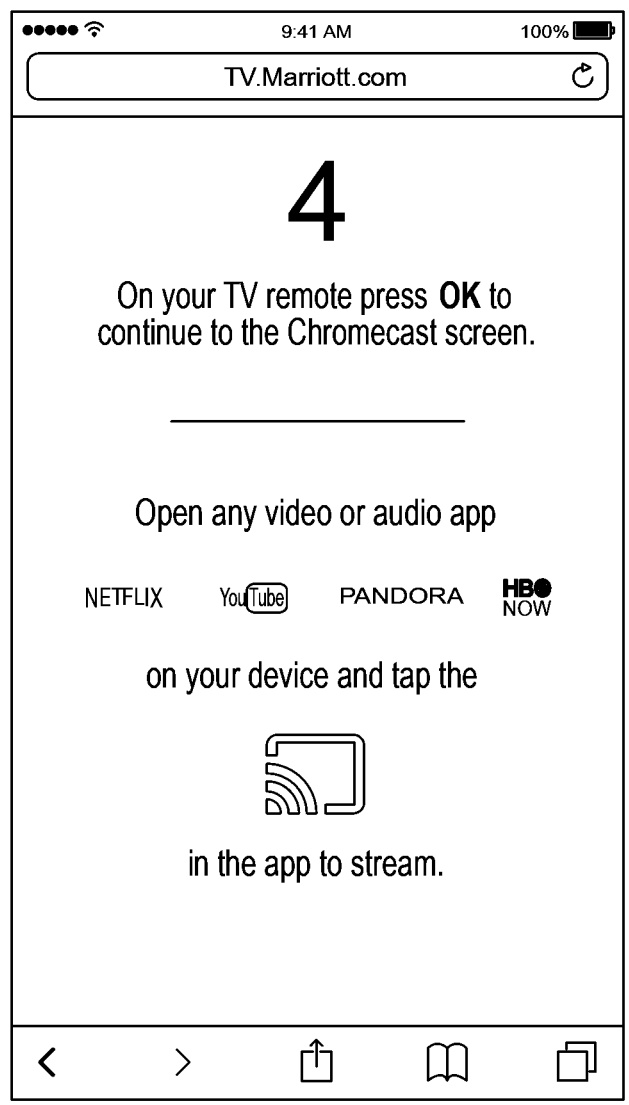
FIG. 2 depicts another example screen shot for a guest to set up in-room content streaming.

FIG. 2 depicts another example screen shot 200 for a guest. This screen 200 can provide instructions to a guest on how to use the media streaming device once the code has been entered. For example, the screen 200 describes how to "cast" content from the user's mobile device to the media streaming device, and provides suggestions of applications which are capable of being cast.

Figure 3:
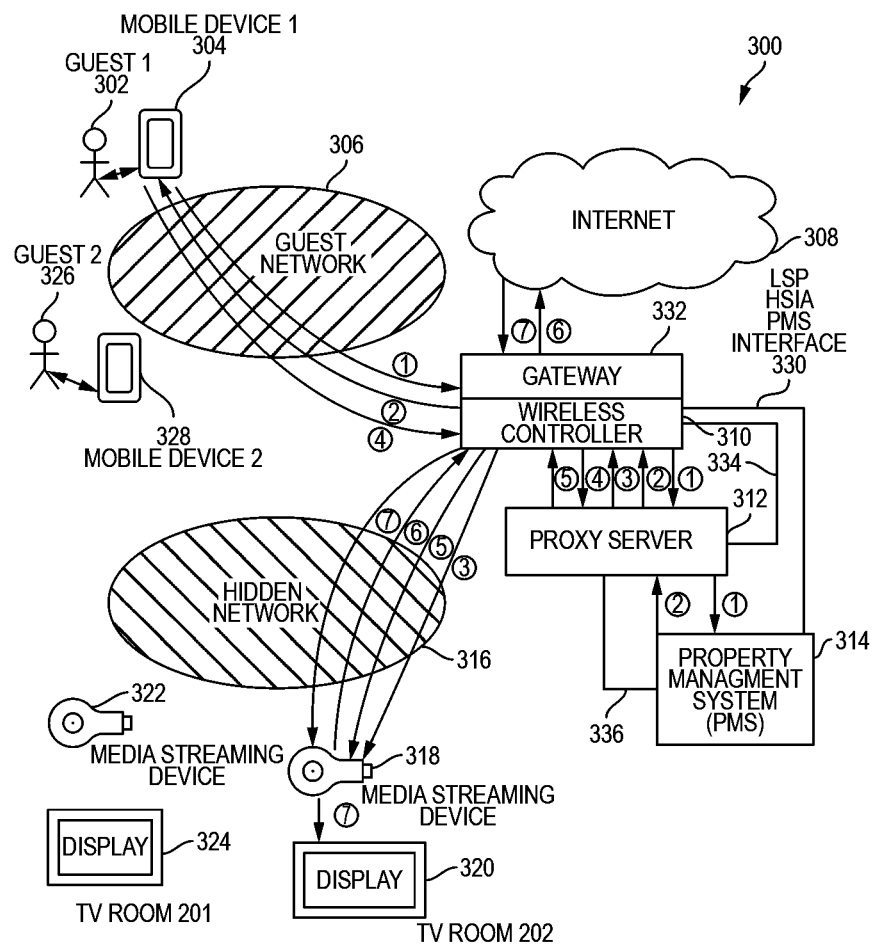
FIG. 3 depicts an example high-level network diagram.

FIG. 3 depicts example high-level network diagram 300. Network diagram 300 includes, a first guest 302, a first mobile device 304, a second guest 326, a second mobile device 328, a property management system (PMS) 314, a HSIA/LSP gateway 332, a wireless controller 310, a guest network 306, a hidden network 316, a proxy server 312, a first media streaming device 318, a first display device 320, a second media streaming device 322, and a second display device 324. The HSIA/LSP gateway 332 can be connected to the PMS 314 via a LSP/HSIA PMS Interface 330, and the HSIA/LSP gateway 332 can similarly be connected to the proxy server 312 using an interface 334. The gateway-proxy server interface 334 can be used, for example, as part of a device registration web service. A connection 336 may similarly be established between the proxy server 312 and the PMS 314 which allows the PMS 314 to communicate check-in/check-out information. Guest 302 may be, for example, a customer at a hotel or other establishment. Mobile device 304 may be, for example, a mobile phone (ANDROID phone, IPHONE, WINDOWS phone, etc.), a tablet (e.g., ANDROID device, Surface, iPad, etc.), or a personal computer (e.g., a laptop, etc.). Media streaming devices 318, 322 may be a device (e.g., CHROMECAST, LENOVO CAST, APPLE TV, ROKU, FIRETV, etc.) that provides streaming video content via a video connection (e.g., HDMI) to an associated display device 320, 324 (e.g., television, monitor, etc.). While FIG. 3 illustrates these various elements as separate, in some configurations the functionality of various components can be combined or incorporated together, such that separate devices may not be needed. For example, in some configurations, the LSP/HSIA gateway 332 can be built into the proxy server 312, eliminating the need interface 334. In some configurations, the proxy server 312 can be combined with the PMS 314. In some configurations, the media streaming devices 318, 322 can be (respectively) combined with their associated displays 320, 324, such that multiple, separate devices may not be needed.

PMS 314 may be used by an employee of a hotel to assign a room to guest 302. PMS 314 may store, for example, the name of guest 302 and assigned room. PMS 314 may send the name of guest 302 and assigned room to the HSIA/LSP gateway 332. When guest 302 is assigned a room, PMS 314 may also instruct proxy server 312 to command media streaming device 318 to display a landing page (e.g., FIG. 1, 100, and/or FIG. 2, 200) on one or more display devices 320 in the assigned room.

Wireless controller 310 may include one or more devices to create or provide access to guest network 306 and hidden network 316. The guest network 306 may be, for example, a hotel-wide WI-FI guest network 306 that guests may access. The guest network 306 can allow the guests 302 to access the Internet 308 or hotel resources via a WI-FI connection. The hidden network 316 can be a hotel-wide wired or wireless VLAN (Virtual Local Area Network) that is hidden from guests.

Guest 302 may register mobile device 304 with guest network 306, using, for example, guest name and assigned room number. HSIA/LSP gateway 332 may manage guest access to the LAN and to the internet. HSIA/LSP gateway 332 may provide DHCP services and when a device (e.g., mobile device 304) tries to access a site on the internet 308, HSIA/LSP gateway 332 may validate the device's 304 MAC address against known registered devices, unknown devices may be redirected to a registration page, for example. The registration page may be where identification such as the room number and last name are captured. HSIA/LSP gateway 332 may receive and/or store the MAC address of the mobile device 304. Once registered, mobile device 304 may have access to the WI-FI guest network 306 and the internet 308. HSIA/LSP gateway 332 may transmit guest room number and a network unique address for mobile device 304 (e.g., MAC address and/or network/IP address) to proxy server 312. Other embodiments may register devices using, for example, a pincode and/or mobile application software (e.g., a mobile app on mobile device 304) to automatically register the device and/or devices stored in a profile (e.g., a rewards profile) when the device is within range of the WI-FI network 306.

Guest 302 may register mobile device 304 with guest network 306, using, for example, guest name and assigned room number. The proxy server 312, upon receiving network registration information from the guest 302 via the mobile device 304, may confirm the registration status of the guest 302 by contacting the PMS 314 or a HSIA/LSP gateway 332 having such information. In certain configurations, the proxy server 312 may register mobile devices using, for example, a pincode and/or mobile application software (e.g., a mobile app on mobile device 304) to automatically register the mobile device 304 and/or mobile devices stored in a profile (e.g., a rewards profile) when the mobile device is within range of the WI-FI guest network 306.

Proxy server 312 may route traffic between hidden network 316 and guest network 306. Proxy server 312 may create proxy rules that allow mobile device 304 to find only the media streaming device 318 (or media streaming devices) in the room (or rooms) assigned to guest 302. Proxy server 312 may, for example, forward only the mDNS requests from media streaming device 318, which is connected to a display device 320 in the room assigned to guest 302, to mobile device 304 via a hidden network 316. Mobile device 304 may send, for example, a mDNS to request all media streaming devices 320, 324 on guest network 306 to report their presence to the mobile device 304. The proxy server 312 may receive this request and forward responses from media streaming device 318 for the room associated with the mobile device 304. In other words, mobile device 1 304 will only be configured to "see" the media streaming device 318 for the guest's 302 room, not the media streaming device 322 for another guest's (guest 2) 326 room. Likewise, guest 2 326, using their mobile device 328, will only be able to stream content to the media streaming device 322 associated with their respective room and display that streaming content on the display in that room. Accordingly, control traffic from mobile device 304 is transmitted on guest network 306 and routed by proxy server 312 to the media streaming device 318 on hidden network 316. The proxy server 312 may be configured to route requests from mobile device 304 based on the MAC of mobile device 304 to media streaming device 318 for the room associated with the mobile device 304. Similarly, communications on the hidden network 316 from media streaming device 318 may be routed by proxy server 312 to mobile device 304 on the guest network 306. In addition, in certain configurations, the mDNS traffic may be modified by proxy server 312 to change the IP and port of media streaming device 318 to that of proxy server 312.

Once mobile device 304 is synchronized with media streaming device 318, the mobile device 304 may instruct media streaming device 318 to stream content to the display 320. On receipt of a streaming command from mobile device 304, media streaming device 318 may initiate a stream from the requested video source. In one configuration, once initiated, streaming is between media streaming device 318 and the Internet 308, where traffic is not routed through mobile device 304 or proxy server 312. Internet content may be routed to the media streaming device 318 without being routed through proxy server 312 and/or mobile device 304. Instead, the mobile device 304 may provide command and control to media streaming device 318 through the proxy server 312 while content bypasses both the mobile device 304 and the proxy server 312. In one configuration, mobile device 304 may provide content to media streaming device 318 by, for example, streaming content of a browser tab or mirroring the screen of mobile device 304.

Proxy server 312 may be a DNS provider and provide static IP addresses to media streaming devices 318, 322. Proxy server 312 may monitor the status of media streaming devices 318, 322 to verify that the devices are working (e.g., a heartbeat). Proxy server 312 may provide (or serve) a web page showing the status of the media streaming device(s) 318, 322 to hotel employees and/or system administrators. Proxy server 312 may be a wired Ethernet device visible to a HSIA/LSP gateway 332. Proxy server 312 may make mDNS requests on behalf of mobile device 304 and/or proxy server 312 may rely on a DNS table to locate media streaming devices 318, 322. Communications between the PMS 314, the proxy server 312, and the media streaming device 318 may be encrypted (e.g., transport layer security secured protocols). The proxy server 312 may map requests and replies between the media streaming device 318 and the mobile device 320. This map can be stored and used as part of an analysis of network traffic, and can reveal guests which are abusing the system, guests which are not using the system, and/or other information about how the system is being utilized.

When the guest 302 checks out, PMS 314 may send a checkout instruction along with the guest room number to proxy server 312. On checkout, proxy server 312 may drop the registered mobile device 304 access to media streaming device 318 (and any other media streaming devices which were assigned to the guest's mobile device 304 by the hotel) and may delete all references to mobile device 318 registered to the room (including any other mobile devices of the guest 302 registered to the room).

Having discussed the overall architecture 300, the disclosure now walks through an example of a guest 302 registering their mobile device 304 to control a media streaming device 318 in the assigned room. For clarity in describing and illustrating this example, FIG. 3 contains numerals "1", "2", "3", "4," "5", "6", and "7" describing specific requests/responses. Generally, the numbers represent a series of requests or responses as the requests or information is forwarded or moved throughout the system. Such generalization is exemplary only, and decapsulating/encapsulating data, reformatting data, and otherwise modifying data during communications occur per normal networking standards.

To begin, the guest 302, having arrived in the assigned room, initiates registration of their mobile device 304 with the guest network 306. To initiate registration, the mobile device 304 sends a registration request (1) to the proxy server 312 via the wireless controller 310. While in some configurations the proxy server 312 can contain, or have already been updated with, the guest's information, in this example the proxy server 312 sends a request (1) for validation of the guest's 302 status to the PMS 314.

If the guest 302 is a valid, registered guest, the PMS 314 sends a confirmation (2) to the proxy server 312. The proxy server 312 updates itself according to the confirmation and sends information (2) (addresses, network keys, etc.) to the guest device 304 via the wireless controller 310. Included within this information is the ability to access and control the media streaming device(s) 318 located in the guest's room or space.

The proxy server 312 also sends information (3) to the media streaming device 318 in the guest's room identifying the mobile device 304 to the media streaming device 318 and otherwise preparing the media streaming device 318 for operations. Because the media streaming devices 318, 322 are connected to the system via a hidden network 316, this process can render the media streaming device 318 being associated with the guest 302 "visible" to the guest's device 304.

At this point, the mobile device 304 is ready to initiate streaming content from the Internet 308 to the media streaming device 318 (which in turns streams the content to the television 320). The guest 302 selects a media app on their mobile device 304 (such as NETFLIX, HULU, WATCH ESPN, AMAZONPRIME, etc.) and begins streaming the content to their mobile device 304. The guest 302 then presses the "cast" option (or an option with similar functionality) on their mobile device 304, causing the media content to begin streaming to the media streaming device 318, which in turn displays the media content on the display 320. In certain configurations, pressing the cast option on the mobile device 304 can cause a window in the mobile device 304 to appear, asking the guest to confirm the media streaming device to which the guest 302 wants to cast the media content.

More specifically, when the guest 302 presses the cast option, this is a command (4) transmitted from the mobile device 304 to the hotel's wireless controller 310. The wireless controller 310 routes the command (4) to the proxy server 312, which registers the command and verifies that the command (4) is from a registered guest 302 and that the media streaming device 318 being activated is the media streaming device associated with the guest 302 and the guest's room.

The proxy server 312 then routes the command (5) to the media streaming device 318 through the wireless controller 310 via the hidden network 316. In this and other similar configurations, the commands from the mobile device 304 are not directly sent from the mobile device 304, but are instead routed through the proxy server 312. In other configurations, the system 300 may be configured such that commands are, after an initialization, directly sent from the mobile device 304 to the media streaming device 318.

The media streaming device 318, having received the command (5) from the proxy server 312 based on the command (4) from the mobile device 304, contacts (6) the database associated with the media content on a network, generally the Internet 308. For example, if the guest 302 selects to watch content from NETFLIX, the media streaming device 318 sends a query (6) to a NETFLIX server over the Internet 308. The NETFLIX server then begins streaming the content (7) back to the media streaming device 318, which in turn outputs the stream on a display device 320. This content being streamed (7) is received by the wireless controller 310, firewalls, etc., from the Internet 308, but is not forwarded to the proxy server 312 or the property management system 314. Instead, the content (7) is directly communicated to the media streaming device 318 which made the request.

Figure 4:
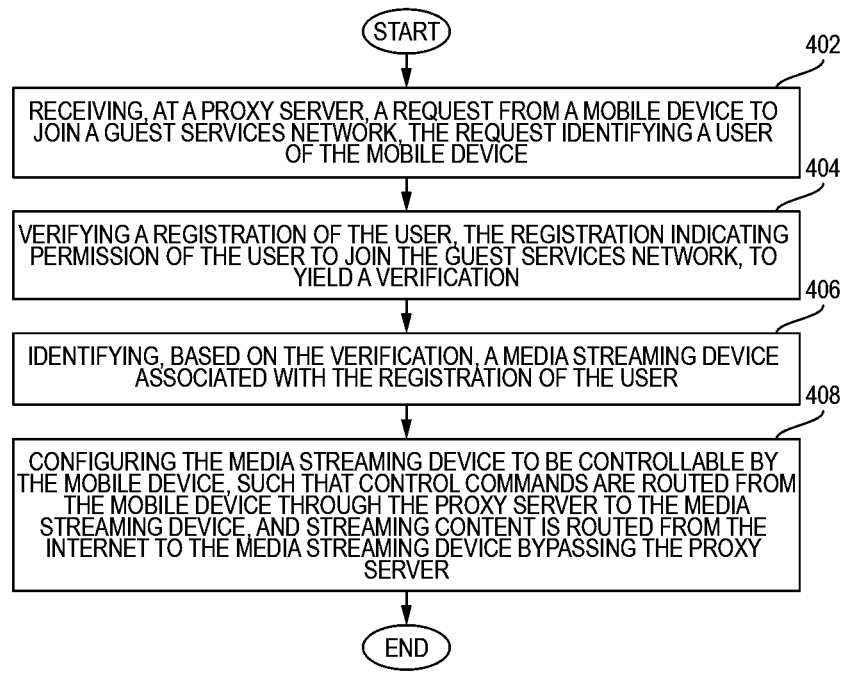
FIG. 4 depicts an example method for a proxy server to initiate in-room content streaming.

FIG. 4 depicts an example method for initiating a media streaming device. This exemplary method, which is performed from the perspective of the proxy server 312 of FIG. 3. The proxy server 312 may receive a request from a mobile device 304 to join a guest services network 306, the request identifying a guest 302 using the mobile device 304 (402). The proxy server 312 may verify a registration of the guest 302 (or other user), the registration indicating permission of the guest 302 to join the guest services network 306, to yield a verification (404). This verification can include, for example, sending, from the proxy server 312, a query to a property management system 314 regarding the registration of the guest 30. The verification can further include receiving, at the proxy server 312 and from the property management system 314, a registration status of the guest 302 based on the query. In some configurations, the verification can include providing a code to the guest 302 which, when the guest enters the code into the mobile device 304 (through an application or a web service), the mobile device 304 sends the code to the proxy server 312 and/or the PMS 314 to verify the code matches a room being occupied by the guest 302. Providing of the code can, for example, be part of the initial setup for in-room content streaming displayed when the guest 302 enters their room (such as that illustrated in FIG. 1).

The proxy server 312 may identify, based on the verification, media streaming device 318 associated with the registration of the guest (406) and may configure the media streaming device 318 to be controllable by the mobile device 304, such that control commands are routed from the mobile device 304 through the proxy server 312 to the media streaming device 318, and streaming content is routed from the Internet 308 to the media streaming device 318 bypassing the proxy server 312 (408). In other words, all data traffic between media streaming device 318 and mobile device 304 may be routed through the proxy server 312.

Features, steps, or components can be added to, or removed from, the exemplary method of FIG. 4. For example, the method can be expanded to include modifying a firewall to allow routing of the control commands from the mobile device 304 through the proxy server 312 to the media streaming device 318, assigning a static IP address to the media streaming device 318, and/or recording usage data of the media streaming device 318.

In addition, variations of the method can include configurations where the media streaming device 318 is configured to be on a hidden network 316 (such as a private virtual local area network), configurations where the proxy server 312 uses mDNS (Multicast Domain Name Service) to allow the mobile device 304 to discover the media streaming device 318, configurations where the proxy server 312 communicates with the mobile device 304 over a guest network 306, and/or configurations where the media streaming device 318 cannot communicate with the mobile device 304 without the proxy server 312.

In some configurations, a HSIA (High Speed Internet Access)/LSP (Layered Service Provider) gateway 332 can receive requests to access the network 306 (e.g., the WI-FI network) from the guest's mobile device 304. The request may include guest name (e.g., last name) and assigned room number. If guest name matches assigned room number, then mobile device 304 may be registered. In such configurations, if the mobile device 304 is successfully registered with the HSIA/LSA 332, the proxy server 312 may then receive the guest room number and an address (e.g., MAC or IP) of the guest's mobile device 304.

In some configurations, the proxy server 312 may create rules that allow authenticated mobile device 304 to detect one or more previously hidden devices 318 (e.g., media streaming devices). The proxy server 312 may use the MAC address or an IP address of the guest's mobile device 304 and/or the assigned room number to associate media streaming device 318 (or multiple media streaming devices) installed in the assigned room associated with the guest's mobile device 304. This association may be tracked in a database and proxy server 312 may be updated by dynamically modifying firewall rules (within the proxy server 312 itself or a distinct firewall unit) to allow and forward control traffic between the mobile device 304 and the media streaming device 318 (or multiple media streaming devices). Multicast DNS discovery services responses may be modified to force all Multicast DNS discovery services traffic between through proxy server 312 so these rules can be enforced.

The mobile device 304 may make an mDNS request for all media streaming devices 318 on guest network. The proxy server 312 may then receive the mDNS request from mobile device 304 and provide a response only from media streaming device 318 (or the multiple media streaming devices) associated with the assigned room. In one configuration, all control traffic may go through the proxy server 312, requiring that mDNS requests be modified to change the IP and port of the media streaming device 318 to be that of the proxy server 312. The firewall of the proxy server 312 may be dynamically modified to reroute the mDNS requests based on the source MAC of the guest device 304, so when control traffic for the media streaming device 312 is received by the proxy server 312 the traffic may be automatically rerouted to the correct media streaming device 318 on the hidden network 316 along with the reverse rules to provide two way communication. In addition, the proxy server 312 may send a unicast signal to the mobile device 304.

A registered mobile device 304 may initiate Internet streams and direct the media streaming device 318 to stream Internet content to a display 320. Content may flow from the Internet 308 to the media streaming device 318 without traveling through the mobile device 304 or the proxy server 312. However, in some configurations where the guest 302 desires to display content stored on their mobile device 304, the media streaming device 318 may receive content directly from the registered mobile device 302. When the guest 302 checks out, the proxy server 312 and/or a HSIA/LSP gateway 332 may delete references to the registered mobile device 302.

Figure 5:
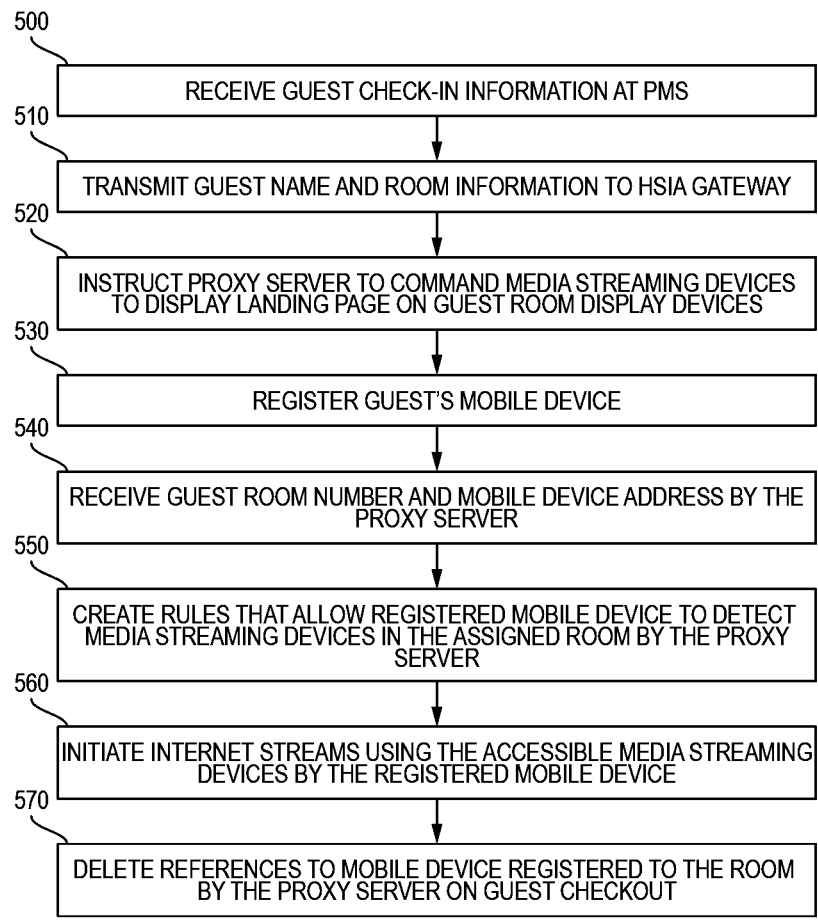
FIG. 5 depicts an example method for providing streaming content.

FIG. 5 depicts an example method for providing streaming content. Flow may start at 500. In 500, PMS 314 may receive check-in information from guest 302. From 500, flow may move to 510.

In 510, PMS 314 may transmit guest name and room information to HSIA/LSP gateway 332. From 510, flow may move to 520.

In 520, PMS 314 may request that proxy server 312 command media streaming device 318 to display a landing page (e.g., FIG. 1, 100 and/or FIG. 2, 200) on attached display devices in the assigned room. From 520, flow may move to 530.

In 530, mobile device 304 may be registered with the network (e.g., WI-FI network 306). For example, HSIA/LSP gateway 332 may receive a request to access the network (e.g., the WI-FI network 306) from mobile device 304.

In 540, if mobile device 304 is successfully registered in 530, proxy server 312 may receive guest room number and an address (e.g., MAC or IP) of mobile device 304. From 540, flow may move to 550.

In 550, proxy server 312 may create rules that allow authenticated mobile device 304 to detect one or more previously hidden devices (e.g., media streaming device 318). From 550, flow may move to 560.

In 560, registered mobile device 304 may initiate internet streams using media streaming device 390.

In 570, when guest 302 checks out, proxy server 312 and HSIA/LSP gateway 332 may delete references to registered mobile device 304. From 570, flow may end.

Illustrative Computer System

Figure 6:
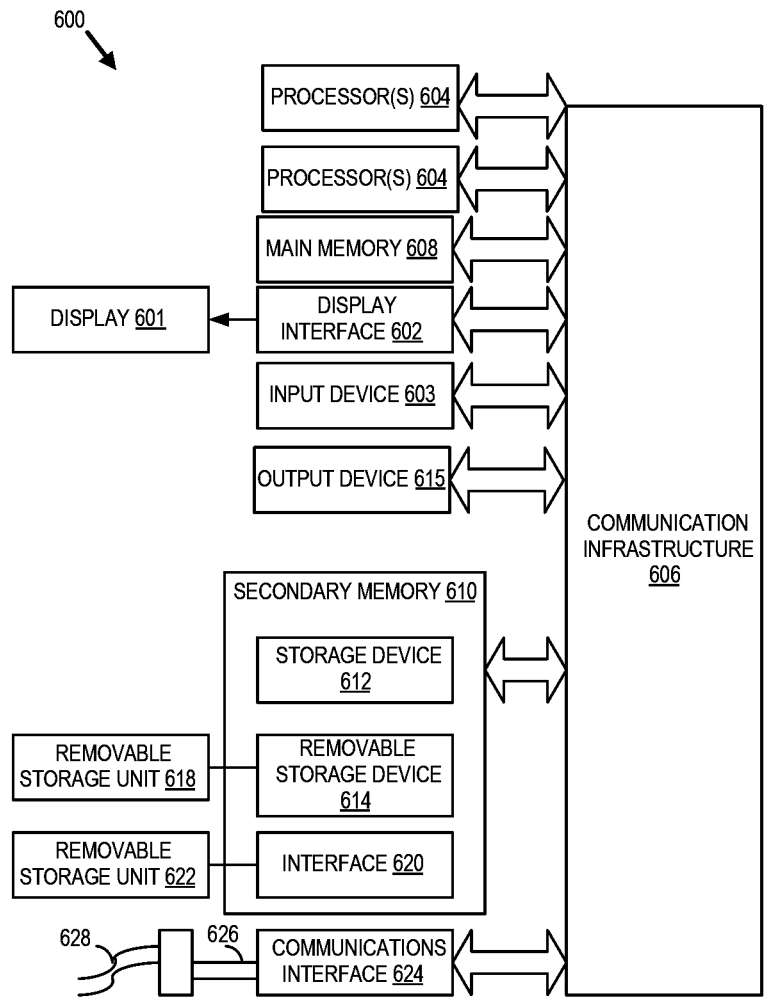
FIG. 6 depicts an exemplary computer for performing the methods and building the systems described herein.

FIG. 6 depicts an illustrative computer system that may be used in implementing the concepts disclosed herein. Specifically, FIG. 6 depicts an illustrative computer system 600 that may be used in computing devices such as, e.g., but not limited to, standalone or client or server devices. FIG. 6 depicts an illustrative computer system that may be used as client device, or a server device, etc. As appropriate, concepts disclosed herein (or any part(s) or function(s) thereof) may be implemented using hardware, software, firmware, or a combination thereof and may be implemented in one or more computer systems or other processing systems. In fact, in one illustrative configuration, one or more computer systems may be configured to be capable of carrying out the functionality described herein. An exemplary computer system 600 is shown in FIG. 6, depicting an illustrative embodiment of a block diagram of an illustrative computer system useful for implementing the present invention. The example computer 600 may be, e.g., (but not limited to) a personal computer (PC) system or mobile device running an operating system such as, e.g., (but not limited to) MICROSOFT WINDOWS SERVER/XP/Vista/WINDOWS 7/WINDOWS 8, etc. available from MICROSOFT Corporation of Redmond, Wash., U.S.A. or an APPLE computer or mobile device executing MAC OS, OS X, or IOS from APPLE of Cupertino, Calif., U.S.A., or a computer or system board running Linux or other UNIX derivative. However, the implementation of the concepts disclosed herein is not limited to these platforms. Instead, such implementation may occur on any appropriate computer system running any appropriate operating system. In one illustrative configuration, the concepts disclosed herein may be implemented on a computer system operating as discussed herein. An illustrative computer system, computer 600, is shown in FIG. 6.

Other components used in practicing the concepts disclosed herein may include items such as, e.g., (but not limited to) a computing device, a communications device, a telephone, a personal digital assistant (PDA), a RASPBERRY PI, an IPHONE, an IPAD, a SURFACE, an ANDROID device, a WINDOWS Mobile device, a 3G/4G wireless device, an LTE device, a wireless device, a personal computer (PC), a handheld PC, a laptop computer, a tablet, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., which items may also be implemented using a computer such as that shown in FIG. 6. In one example, services may be provided on demand using, e.g., an interactive television device (iTV), a video on demand system (VOD), via a digital video recorder (DVR), and/or other on demand viewing system. Computer system 600 and/or parts of computer system 600 may be used to implement, for example, the system and components described by in network diagram 300, including mobile device 304, PMS 314, a HSIA/LSP gateway 332, wireless controller 310, guest network 306, hidden network 316, proxy server 312, and media streaming device 318 and/or other components as described in FIG. 3 and techniques described in FIG. 4.

The computer system 600 may include one or more processors, such as, e.g., but not limited to, processor(s) 604. The processor(s) 604 may be connected to a communication infrastructure 606 (e.g., but not limited to, a communications bus, cross-over bar, interconnect, or network, etc.). Processor 604 may include any type of processor, microprocessor, or processing logic that may interpret and execute instructions (e.g., for example, a field programmable gate array (FPGA)). Processor 604 may comprise a single device (e.g., for example, a single core) and/or a group of devices (e.g., multi-core). The processor 604 may include logic configured to execute computer-executable instructions configured to implement one or more of the configurations described herein. The instructions may reside in main memory 608 or secondary memory 610. Processors 604 may also include multiple independent cores, such as a dual-core processor or a multi-core processor. Processors 604 may also include one or more graphics processing units (GPU) which may be in the form of a dedicated graphics card, an integrated graphics solution, and/or a hybrid graphics solution. Various illustrative software configurations may be described in terms of this illustrative computer system. After reading this description, it will become apparent to a person skilled in the relevant art(s) how to implement the concepts disclosed herein using other computer systems and/or architectures.

Computer system 600 may include a display interface 602 that may forward, e.g., but not limited to, graphics, text, and other data, etc., from the communication infrastructure 606 (or from a frame buffer, etc., not shown) for display on display 601. Display 601 may be, for example, a television, a computer monitor, iPad, a mobile phone screen, a touch screen, etc. Display interface 602 may be, for example, a High-Definition Multimedia Interface (HDMI), which may include both video data and audio data. Audio data may be output as sound through, for example, a speaker on a television.

The computer system 600 may also include, e.g., but is not limited to, a main memory 608, random access memory (RAM), and a secondary memory 610, etc. Main memory 608, random access memory (RAM), and a secondary memory 610, etc., may be a computer-readable medium that may be configured to store instructions configured to implement one or more configurations and may comprise a random-access memory (RAM) that may include RAM devices, such as Dynamic RAM (DRAM) devices, flash memory devices, Static RAM (SRAM) devices, etc. For example, the computer-readable medium may contain instructions which, when executed by a processor, cause the processor to perform specific operations for the various process steps of the invention.

The secondary memory 610 may include, for example, (but is not limited to) a hard disk drive 612 and/or a removable storage drive 614, representing a floppy diskette drive, a magnetic tape drive, an optical disk drive, a compact disk drive CD-ROM, flash memory, etc. The removable storage drive 614 may, e.g., but is not limited to, read from and/or write to a removable storage unit 618 in a well-known manner. Removable storage unit 618, also called a program storage device or a computer program product, may represent, e.g., but is not limited to, a floppy disk, magnetic tape, optical disk, compact disk, flash memory, etc. which may be read from and written to removable storage drive 614. As will be appreciated, the removable storage unit 618 may include a computer usable storage medium having stored therein computer software and/or data.

In various configurations, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM)) and associated socket, and other removable storage units 622 and interfaces 620, which may allow software and data to be transferred from the removable storage unit 622 to computer system 600.

Computer 600 may also include an input device 603 which may include any mechanism or combination of mechanisms that may permit information to be input into computer system 600 from, e.g., a user. Input device 603 may include logic configured to receive information for computer system 600 from, e.g. a user. Examples of input device 603 may include, e.g., but not limited to, a mouse, pen-based pointing device, or other pointing device such as a digitizer, a touch sensitive display device, and/or a keyboard or other data entry device (none of which are labeled). Other input devices 603 may include, e.g., but are not limited to, a biometric input device, a video source, an audio source, a microphone, a web cam, a video camera, a light-sensitive device, and/or other camera. Still other input devices 603 may include, e.g., but not limited to, an imaging device, a touch screen 650, a light-sensitive device, sensing elements, accelerometers, gyroscopes, and/or magnetometers.

Computer 600 may also include output devices 615 which may include any mechanism or combination of mechanisms that may output information from computer system 600. Output device 615 may include logic configured to output information from computer system 600. Examples of output device 615 may include, e.g., but not limited to, display 601, and display interface 602, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. The output may also be provided as sound through, for example, a speaker.

Computer 600 may include input/output (I/O) devices such as, e.g., (but not limited to) input device 603, communications interface 624, cable 628 and communications path 626, etc. These devices may include, e.g., but are not limited to, a network interface card, and/or modems.

Communications interface 624 may allow software and data to be transferred between computer system 600 and external devices.

In this document, the terms "computer program medium" and "computer readable medium" may be used to generally refer to tangible, non-transitory media such as, e.g., but not limited to, removable storage drive 614, a hard disk installed in hard disk drive 612, memory unit, flash memories, removable discs, non-removable discs, etc. In addition, it should be noted that a computer-readable medium that comprises computer-executable instructions for execution in a processor may be configured to store various configurations of the various concepts disclosed herein. Tangible computer-readable storage media, computer-readable storage devices, computer-readable memory devices, non-transitory computer-readable media, etc., expressly exclude media such as transitory waves, energy, carrier signals, electromagnetic waves, and signals per se.

References to "one configuration," "a configuration," "example configuration," "various configurations," etc., may indicate that the configuration(s) so described may include a particular feature, structure, or characteristic. Further, repeated use of the phrase "in one configuration," "in an example configuration," or "in an illustrative configuration," do not necessarily refer to the same configuration, although they may.

The various examples and configurations described herein may be combined, and/or features of the examples/configurations may be combined, to form new configurations.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Implementations of the concepts disclosed herein may include apparatuses for performing the operations described herein. An apparatus may be specially constructed for the desired purposes, or it may comprise a general purpose device selectively activated or reconfigured by a program stored in the device.

Configurations may, in various instances, be embodied as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. A general purpose computer may be specialized by storing programming logic that enables one or more processors to perform the techniques indicated herein and the steps of or descriptions shown in, for example, FIG. 4 or FIG. 5.

While various examples, variations, and concepts have been described above, it should be understood that they have been presented by way of example only, and not limitation. Thus, the breadth and scope of the present disclosure should not be limited by any of the above-described illustrative examples, but should instead be defined only in accordance with the following claims and their equivalents.

What is claimed is:

1. A method for customizing controllable devices accessible by a guest in a lodging unit, comprising:

storing, by one or more servers, guest check-in information;

receiving, by the one or more servers, a registration request from a mobile device of the guest;

registering, by the one or more servers, the mobile device by comparing the registration request with the guest check-in information;

provisioning, by the one or more servers, WiFi access for the mobile device on a hidden Virtual Local Area Network (VLAN) of a room associated with the guest, wherein the room is one of a plurality of rooms in the lodging unit and each room of the plurality of rooms include a plurality of controllable devices;

identifying, by a proxy server accessible using the hidden VLAN, at least one controllable device located in the room associated with the guest, the at least one controllable device is connected to a hidden network;

receiving, by the proxy server, mobile device identification and a guest identifier from the one or more servers after registering the mobile device;

permitting, by the proxy server, select network communication between the at least one controllable device and the mobile device over the hidden network based on the mobile device identification and the guest identifier;

communicating, using the proxy server, information with the mobile device for control of the at least one controllable device located in the room associated with the guest;

modifying, by the proxy server, domain name service (DNS) requests from the mobile device for the plurality of controllable devices, wherein modification of the DNS requests reroutes the DNS requests to the at least one controllable device of the room associated with the guest on the hidden network;

routing, by the proxy server, instructions from the mobile device to the at least one controllable device for customizing the at least one controllable device associated with the room of the guest, wherein access to the at least one controllable device of the room associated with the guest is provided to the mobile device by the proxy server using the hidden network and access to any of the plurality of controllable devices of the plurality of rooms excluding the room of the guest is restricted to the mobile device by the proxy server; and controlling, the at least one controllable device associated with the room of the guest based on the instructions from the mobile device of the guest for customizing the at least one controllable device.

2. The method of claim 1, wherein the plurality of controllable devices are connected to, or incorporated in, a display device located in the room associated with the guest.

3. The method of claim 1, wherein the plurality of controllable devices includes media streaming device.

4. The method of claim 1, wherein the proxy server uses mDNS (Multicast Domain Name Service) to allow the mobile device to discover the at least one controllable device.

5. The method of claim 1, wherein the registering of the mobile device is performed through a WI-FI network.

6. The method of claim 1, wherein the guest identifier is a guest name and an assigned room number.

7. The method of claim 1, wherein the mobile device identification includes an IP address or a MAC address.

8. The method of claim 1, further comprising updating the proxy server by dynamically modifying firewall rules to allow and forward control traffic between the mobile device and the at least one controllable device.

9. A system for customizing at least one controllable device in a lodging unit, the system comprising:
   at least one processor; and
   at least one memory coupled with the at least one processor, wherein the at least one memory is configured to store guest check-in information, and wherein the at least one processor and the at least one memory are configured to:
   receive a registration request from a mobile device of a guest;
   register the mobile device by comparing the registration request with the guest check-in information;
   provision WiFi access for the mobile device on a hidden Virtual Local Area Network (VLAN) of a room associated with the guest, wherein the room is one of a plurality of rooms in the lodging unit and each room of the plurality of rooms include a plurality of controllable devices;
   identify using the hidden VLAN, the at least one controllable device located in the room associated with the guest, the at least one controllable device is connected to a hidden network;
   receive mobile device identification and a guest identifier after registering the mobile device;
   permit select network communication between the at least one controllable device and the mobile device over the hidden network based on the mobile device identification and the guest identifier;
   communicate information with the mobile device for control of the at least one controllable device located in the room associated with the guest;
   modify domain name service (DNS) requests from the mobile device for the plurality of controllable devices, wherein modification of the DNS requests reroutes the DNS requests to the at least one controllable device of the room associated with the guest on the hidden network;
   route instructions from the mobile device to the at least one controllable device for customizing the at least one controllable device associated with the room of the guest, wherein access to the at least one controllable device of the room associated with the guest is provided to the mobile device by a proxy server using the hidden network and access to any of the plurality of controllable devices of the plurality of rooms excluding the room of the guest is restricted to the mobile device by the proxy server; and
   control the at least one controllable device associated with the room of the guest based on the instructions from the mobile device of the guest for customizing the at least one controllable device.

10. The system of claim 9, wherein the plurality of controllable devices are connected to, or incorporated in, a display device located in the room associated with the guest.

11. The system of claim 9, wherein the plurality of controllable devices includes media streaming device.

12. The system of claim 9, wherein the proxy server uses mDNS (Multicast Domain Name Service) to allow the mobile device to discover the at least one controllable device.

13. The system of claim 9, wherein the mobile device is registered through a WI-FI network.

14. The system of claim 9, wherein the guest identifier is a guest name and an assigned room number.

15. The system of claim 9, wherein the mobile device identification includes an IP address or a MAC address.

16. The system of claim 9, further comprising updating the proxy server by dynamically modifying firewall rules to allow and forward control traffic between the mobile device and the at least one controllable device.

17. A system for controlling a plurality of controllable devices by a guest in a lodging unit, the system comprising:
   one or more servers configured to:
   store guest check-in information;
   receive a registration request from a mobile device of the guest;
   register the mobile device by comparing the registration request with the guest check-in information;
   provision WiFi access for the mobile device on a hidden Virtual Local Area Network (VLAN) of a room associated with the guest, wherein the room is one of a plurality of rooms in the lodging unit and each room of the plurality of rooms include the plurality of controllable devices; and
   a proxy server configured to:
   identify using the hidden VLAN, at least one controllable device located in the room associated with the guest, the at least one controllable device is connected to a hidden network;
   receive mobile device identification and a guest identifier from the one or more servers after registering the mobile device;
   permit select network communication between the at least one controllable device and the mobile device over the hidden network based on the mobile device identification and the guest identifier;
   communicate information with the mobile device for control of the at least one controllable device located in the room associated with the guest;
   modify domain name service (DNS) requests from the mobile device for the plurality of controllable devices, wherein modification of the DNS requests reroutes the DNS requests to the at least one controllable device of the room associated with the guest on the hidden network; and route instructions from the mobile device to the at least one controllable device for customizing the at least one controllable device associated with the room of the guest, wherein access to the at least one controllable device of the room associated with the guest is provided to the mobile device by the proxy server using the hidden network and access to any of the plurality of controllable devices of the plurality of rooms excluding the room of the guest is restricted to the mobile device by the proxy server, and wherein the one or more servers are configured to control the at least one controllable device associated with the room of the guest based on the instructions from the mobile device of the guest for customizing the at least one controllable device.

18. The system of claim 17, wherein the proxy server uses mDNS (Multicast Domain Name Service) to allow the mobile device to discover the at least one controllable device, and wherein the mobile device is registered through a WI-FI network.

19. The system of claim 17, wherein the guest identifier is a guest name and an assigned room number and wherein the mobile device identification includes an IP address or a MAC address.

20. The system of claim 17, wherein the proxy server is updated based on modification of firewall rules to allow and forward control traffic between the mobile device and the at least one controllable device.

\* \* \* \* \*